United States Patent
Murota et al.

(10) Patent No.: US 7,309,941 B2
(45) Date of Patent: Dec. 18, 2007

(54) ROTATING ELECTRIC MACHINE AND ELECTRIC VEHICLE

(75) Inventors: Keiko Murota, Iwata (JP); Shinya Naito, Iwata (JP); Hiroyuki Ishihara, Iwata (JP); Haruyoshi Hino, Iwata (JP); Junji Terada, Iwata (JP); Tomohiro Ono, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 190 days.

(21) Appl. No.: 10/551,515

(22) PCT Filed: Feb. 6, 2004

(86) PCT No.: PCT/JP2004/001299

§ 371 (c)(1),
(2), (4) Date: Sep. 28, 2005

(87) PCT Pub. No.: WO2004/088826

PCT Pub. Date: Oct. 14, 2004

(65) Prior Publication Data

US 2007/0029887 A1    Feb. 8, 2007

(51) Int. Cl.
*H02K 1/22* (2006.01)

(52) U.S. Cl. .................... 310/268; 310/75 R; 310/209; 310/75 C

(58) Field of Classification Search .............. 310/67 A, 310/75 C, 75 R, 96–99, 209, 268
See application file for complete search history.

(56) References Cited

U.S. PATENT DOCUMENTS

| | | |
|---|---|---|
| 5,525,115 A | 6/1996 | Vanzini |
| 5,719,459 A | 2/1998 | Hasegawa |
| 5,763,977 A | 6/1998 | Shimasaki et al. |
| 5,770,908 A | 6/1998 | Kim |
| 6,005,317 A * | 12/1999 | Lamb .......................... 310/103 |
| 6,053,833 A | 4/2000 | Masaki |
| 6,137,203 A * | 10/2000 | Jermakian et al. .......... 310/191 |
| 6,428,442 B1 | 8/2002 | Turgay et al. |
| 6,765,327 B2 * | 7/2004 | Hashimoto et al. ........... 310/90 |
| 6,943,478 B2 * | 9/2005 | Zepp et al. .................. 310/191 |
| 7,042,128 B2 * | 5/2006 | Zepp et al. .................. 310/191 |
| 7,100,747 B1 * | 9/2006 | Conrad et al. ............... 188/162 |
| 2002/0117916 A1 | 8/2002 | Terada |
| 2003/0189388 A1 * | 10/2003 | Hashimoto et al. ......... 310/268 |
| 2004/0041490 A1 * | 3/2004 | Fei .............................. 310/184 |
| 2005/0104469 A1 * | 5/2005 | Zepp et al. .................. 310/191 |

FOREIGN PATENT DOCUMENTS

| | | |
|---|---|---|
| JP | 56-171558 | 5/1955 |
| JP | 01-174250 | 7/1989 |
| JP | 03-215154 | 9/1991 |
| JP | 04-168962 | 6/1992 |

(Continued)

*Primary Examiner*—Thanh Lam
(74) *Attorney, Agent, or Firm*—Hogan & Hartson LLP

(57) ABSTRACT

A rotating electric machine according to the present invention includes: a rotation axis extending along a first direction; a first rotor for coupling with the rotation axis to rotate together with the rotation axis; a first stator disposed so as to oppose the first rotor; and a moving mechanism for moving the first rotor so that relative positions of the first rotor and the first stator are changed.

21 Claims, 9 Drawing Sheets

FOREIGN PATENT DOCUMENTS

| | | |
|---|---|---|
| JP | 04-321850 | 11/1992 |
| JP | 05-199705 | 8/1993 |
| JP | 05-300712 | 11/1993 |
| JP | 05-328664 | 12/1993 |
| JP | 05-336700 | 12/1993 |
| JP | 06-141401 | 5/1994 |
| JP | 06-343251 | 12/1994 |
| JP | 07-250465 | 9/1995 |
| JP | 09-037598 | 2/1997 |
| JP | 09-308200 | 11/1997 |
| JP | 09-331660 | 12/1997 |
| JP | 11-313405 | 11/1999 |
| JP | 2001-289315 | 10/2001 |
| JP | 2002-233176 | 8/2002 |
| JP | 2002-247822 | 8/2002 |
| JP | 2002-300760 | 10/2002 |
| JP | 2002-325412 | 11/2002 |
| JP | 2003-048437 | 2/2003 |

\* cited by examiner

ROTATING ELECTRIC MACHINE AND ELECTRIC VEHICLE

TECHNICAL FIELD

The present invention relates to a rotating electric machine and an electric vehicle capable of freely adjusting their output characteristics.

BACKGROUND ART

In recent years, from the standpoint of environmental issues and energy issues, vehicles utilizing electric motors as driving sources are attracting attention.

A driving source used in a vehicle is required to generate a large driving torque during a low speed travel, e.g., when the vehicle pulls out or goes up a slope, etc. During a steady travel, on the other hand, the driving torque may be small but rapid rotation is required. In other words, an electric motor which is capable of changing its output characteristics is required.

For example, the specification of Japanese Patent No. 2749560 discloses a technique of changing the characteristics of a motor by adjusting the gap between the teeth of a stator and the magnet of a rotor.

The motor of this technique comprises, as shown in FIG. 1, a drum-like rotor 125, a stator 130, and a fastening/adjustment member 160 for adjusting the gap between a bush 146 and the drum-like rotor 125. If a head 162 of the fastening/adjustment member 160 is manipulated so as to loosen the fastening/adjustment member 160, the elastic member 161 causes the bush 146 to be spaced apart from the stator 130. As a result, a gap G between a magnet 141 of the rotor 125 and the stator 130 can be increased. On the other hand, by tightening the fastening/adjustment member 160, the gap G between the magnet 141 and the stator 130 can be reduced. The disclosure states that, through adjustments by changing the gap G, it becomes possible to inexpensively produce a motor which is suitable for many specifications.

Japanese Laid-Open Patent Publication No. 3-215154 discloses a technique, in a motor for rotation-driving the reels of a tape recorder, of adjusting the gap between the rotor and the stator. This technique causes an electric current flowing in an electromagnet to change in proportion with an electric current flowing in the motor, thus adjusting the gap with the magnetic force of the electromagnet and a spring which is attached to the axis of the motor.

On the other hand, Japanese Laid-Open Patent Publication No. 9-37598 discloses a technique of changing the power generation characteristics of a motor which is used as an electric generator. According to this technique, the amount of generated power can be adjusted by adjusting the overlap between the magnet of the rotor and the coil of the stator.

However, a motor of any such conventional technique may have difficulties in changing its output characteristics during the motor rotation, or may be unsuitable for use as a driving source of a vehicle.

Moreover, as compared to an internal combustion engine, an electric motor permits a large freedom with respect to its outer shape, and motors of various shapes can be realized. Therefore, in the case where an electric motor is used as a driving source of a vehicle, it is possible to make the outer shape of the driving source small, or design an outer shape which is in accordance with the space that is allocated for the driving source, for example by placing the driving source within the wheel of a tired wheel, as compared to the case of using an internal combustion engine. However, in the case where there are limits to the shape and size of the mechanism for causing changes in the output characteristics of the electric motor, such advantages of an electric motor may be undermined.

Furthermore, in the case where an electric motor is used as a driving source of a vehicle, and a battery is used to cause the electric motor to rotate, the weight of the battery is large relative to the battery capacity, so that it is preferable that the electric motor has a high energy efficiency for making the travel distance of the vehicle as long as possible. Therefore, the mechanism for causing changes in the output characteristics is required to not introduce a large reduction in the energy efficiency of the electric motor.

Particularly in the case where an electric motor is used as a driving source of a two-wheeled vehicle, it is desirable that as many such problems are solved as possible.

DISCLOSURE OF INVENTION

The present invention aims to solve at least one of the aforementioned problems, and provide a rotating electric machine and an electric vehicle capable of freely adjusting the output characteristics thereof.

A rotating electric machine according to the present invention comprises: a rotation axis extending along a first direction; a first rotor for coupling with the rotation axis to rotate together with the rotation axis; a first stator disposed so as to oppose the first rotor; and a moving mechanism for moving the first rotor so that relative positions of the first rotor and the first stator are changed.

In a preferred embodiment, the first stator opposes the first rotor while being spaced apart therefrom along the first direction, and the moving mechanism adjusts a gap between the first rotor and the first stator by moving the first rotor along the first direction.

In a preferred embodiment, the moving mechanism includes a moving member, and the moving member pushes the first rotor along the first direction to move the first rotor so as to be spaced apart from the first stator.

In a preferred embodiment, the moving member has a cylindrical shape having a throughhole, and the rotation axis is inserted in the throughhole.

In a preferred embodiment, the moving mechanism further includes a detent member for engaging with the moving member so as to prevent the moving member from rotating with the first rotor.

In a preferred embodiment, the moving mechanism further includes a bearing, and the moving member and the first rotor are in contact with each other via the bearing.

In a preferred embodiment, the moving mechanism further includes a bearing provided between the moving member and the rotation axis.

In a preferred embodiment, the bearings are provided at least near both ends of the throughhole of the moving member.

In a preferred embodiment, the moving mechanism includes an adjustment motor, and the gap between the first rotor and the first stator is adjusted by converting rotation of the adjustment motor into a displacement along the first direction for moving the first rotor along the first direction.

In a preferred embodiment, the adjustment motor includes a second rotor having a throughhole; the rotation axis is inserted in the throughhole of the second rotor; and the second rotor rotates around the rotation axis.

In a preferred embodiment, the moving mechanism further includes an adjustment motor; the adjustment motor includes a second rotor having a throughhole in which the rotation axis and the moving member are inserted; a side face defining the throughhole has a thread; and an outer side face of the moving member has a thread for meshing with the thread on the inner side face of the second rotor.

In a preferred embodiment, the rotation axis penetrates through the second rotor of the adjustment motor, and has an end portion which is supported by a bearing.

In a preferred embodiment, the rotation axis and the first rotor are coupled via serrations, and the first rotor is slidable with respect to the rotation axis along the first direction.

In a preferred embodiment, the first stator has a space provided near the rotation axis, and at least a part of the moving member is located in the space.

In a preferred embodiment, the first rotor has a plate shape having a recess near the rotation axis, the recess being depressed in the axial direction.

In a preferred embodiment, a driving axis disposed coaxially with the rotation axis is further comprised; and a transmission for converting and transmitting a rotation speed of the rotation axis to the driving axis, wherein at least a part of the transmission is inserted in the recess of the first rotor.

In a preferred embodiment, the transmission is a speed reducer, the speed reducer including: a sun gear provided on the rotation axis; a ring gear; and a planet gear rotating around a rotation axis affixed to the driving axis, and orbiting around the driving axis by being meshed with the sun gear and the ring gear.

In a preferred embodiment, the transmission and the moving mechanism are disposed so that the first rotor is interposed therebetween.

In a preferred embodiment, a driving circuit for generating a magnetic field in the first stator is further comprised, wherein the first stator includes a plurality of coils which are disposed along a circumference while leaving a space therein, and the driving circuit is disposed in the space in the circumference.

In a preferred embodiment, the rotation axis and the rotor are moved integrally by the moving member.

In a preferred embodiment, a driving axis disposed coaxially with the rotation axis is further comprised, wherein the rotation axis and the driving axis are coupled via serrations, and the rotation axis is slidable with respect to the driving axis along the first direction.

An electric vehicle according to the present invention comprises: any of the rotating electric machines defined above; and a tired wheel driven by the rotating electric machine.

An electric vehicle according to the present invention comprises: any of the rotating electric machines defined above; and a tired wheel driven by the rotating electric machine.

An electric vehicle unit according to the present invention comprises: any of the rotating electric machines defined above; and a tired wheel driven by the rotating electric machine.

BEST MODE FOR CARRYING OUT THE INVENTION

First Embodiment

A first embodiment of a rotating electric machine and an electric vehicle according to the present invention will be described. In the present embodiment, an electric two-wheeled vehicle is illustrated as an example of an electric vehicle.

Figure 1:
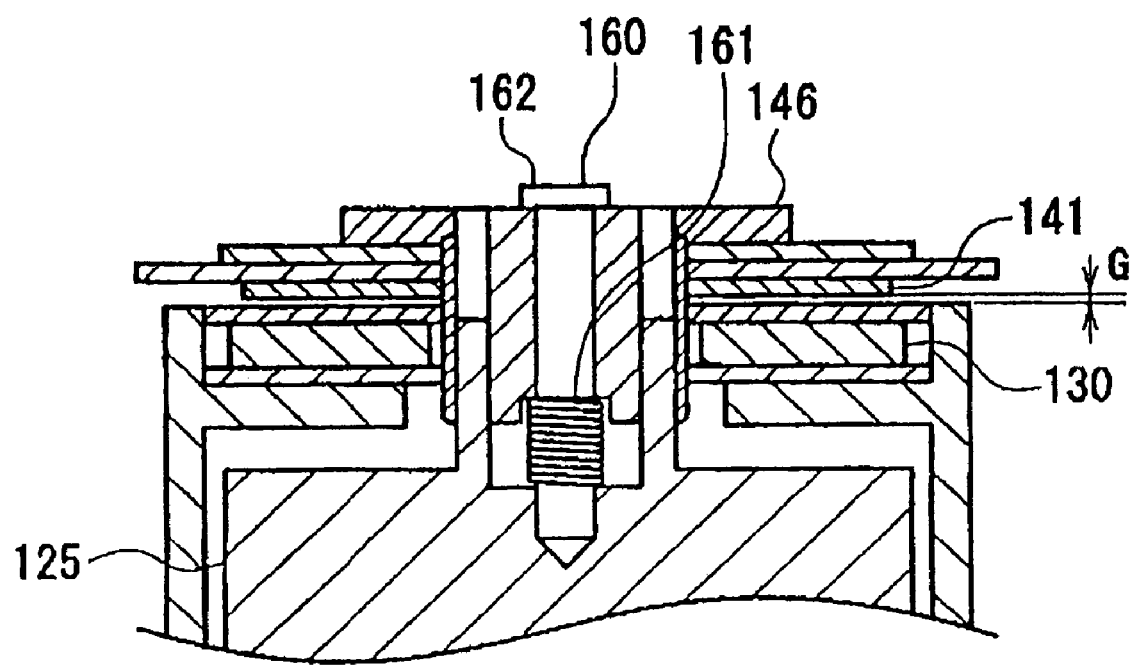
FIG. 1 is a cross-sectional view showing the structure of a conventional motor.
Figure 2:
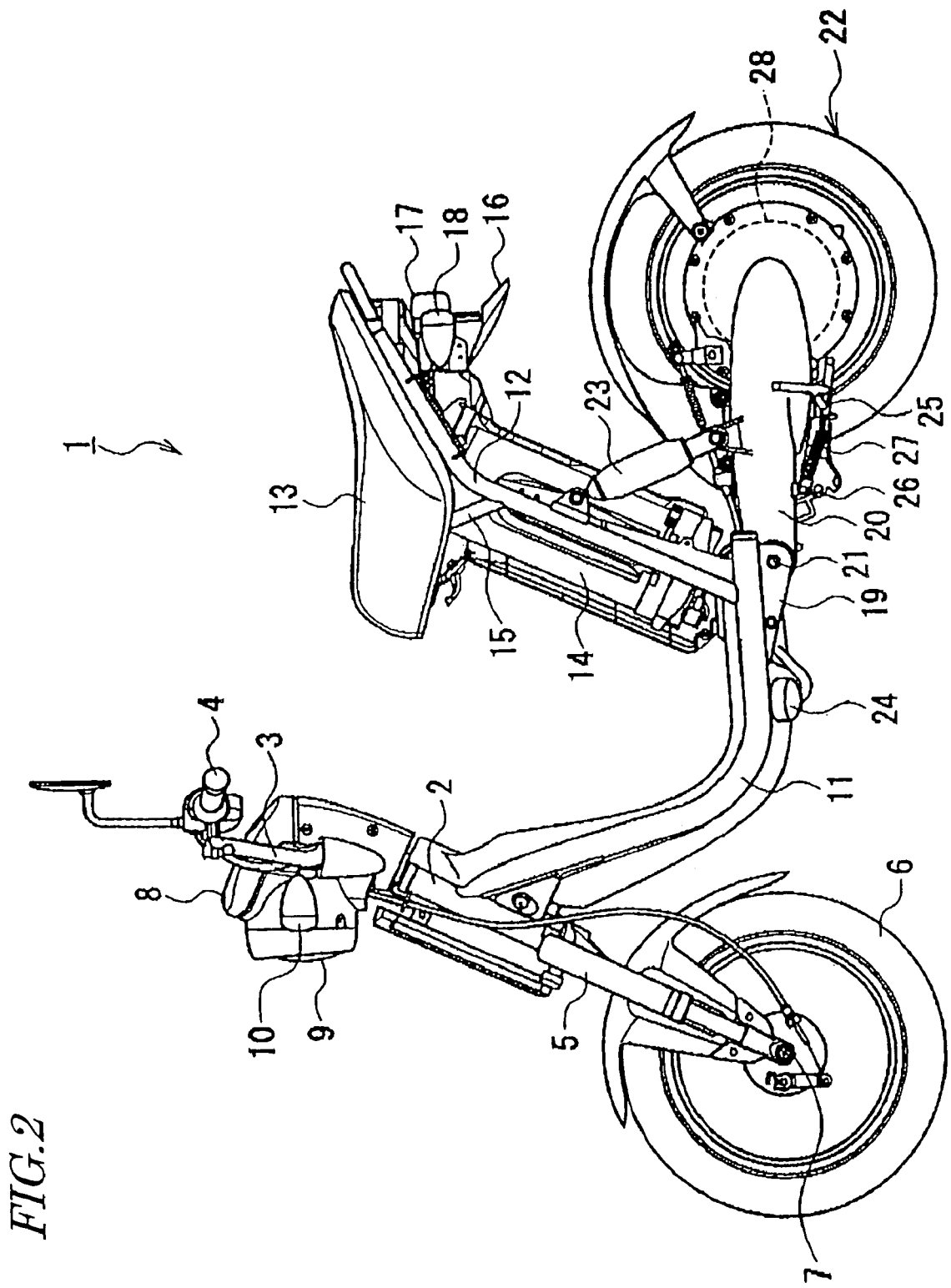
FIG. 2 is a side view of an electric two-wheeled vehicle as a first embodiment of the present invention.
Figure 3:
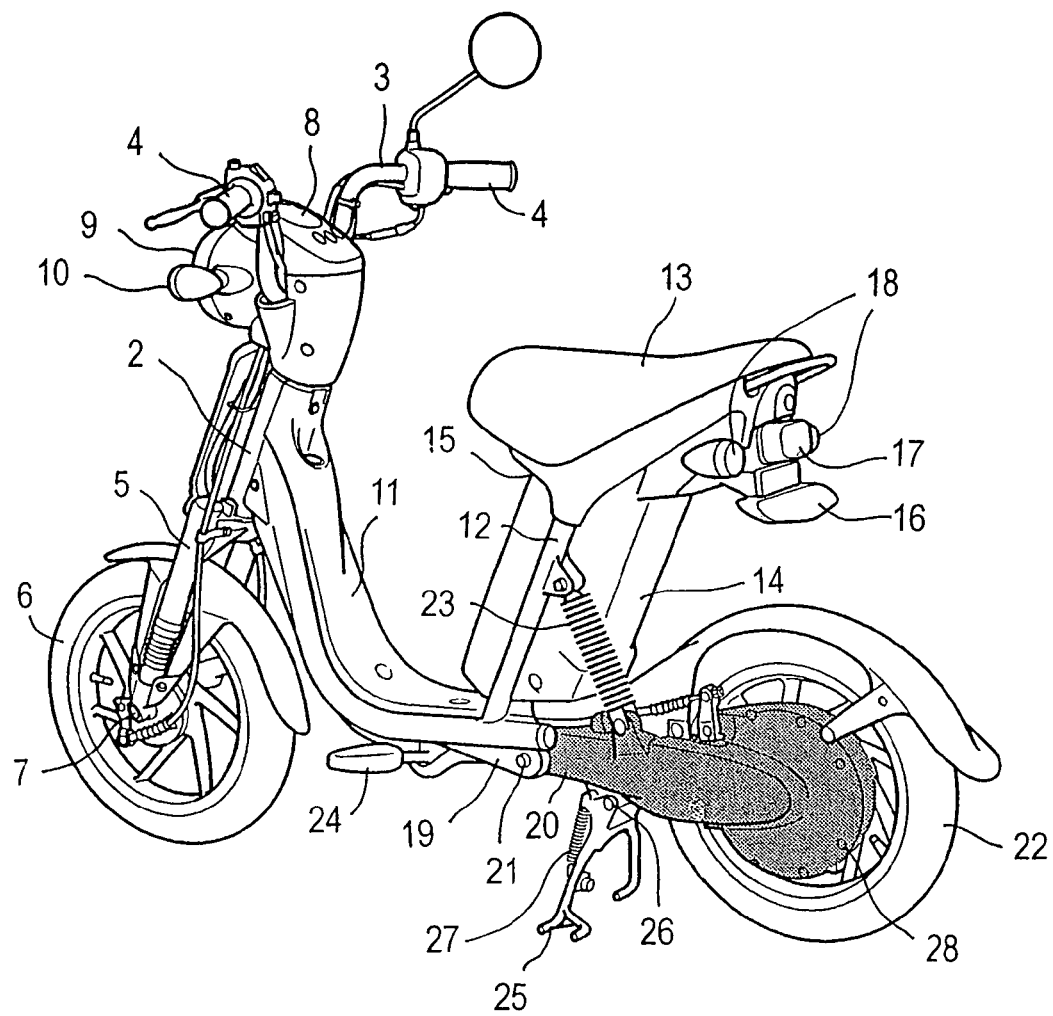
FIG. 3 is a perspective view of the electric two-wheeled vehicle shown in FIG. 2.

FIG. 2 is a side view showing an electric two-wheeled vehicle 1 of the first embodiment. FIG. 3 is a perspective view showing the electric two-wheeled vehicle 1 as seen from behind. The electric two-wheeled vehicle 1 comprises a front wheel 6, a rear wheel 22, an electric motor 28, and a battery 14, such that the electric motor 28 is caused to rotate with the electric power obtained from the battery 14, the rear wheel 22 being driven by this rotation. Hereinafter, the overall structure of the electric two-wheeled vehicle 1 will be described, sequentially from the body front.

The electric two-wheeled vehicle 1 includes a head pipe 2 at an upper portion of its body front, with a steering axis (not shown) being inserted in the head pipe 2 so as to be capable of pivoting. A steering wheel 3 is attached to an upper end of the steering axis. Grips 4 are provided at both ends of the steering wheel 3, the right-side grip constituting a throttle grip. A meter 8 is provided near a central portion of the steering wheel 3. Moreover, a head lamp 9 is disposed below the meter 8, with flasher lamps 10 being provided on both sides thereof (only the left side being shown in FIG. 2 and FIG. 3).

A pair of right- and left-body frames 11 are provided so as to extend from the head pipe 2 toward the body rear. Each body frame 11 has a rounded pipe shape, extends obliquely below from the head pipe 2, and is turned in an arc shape at a height near the center of the rear wheel 22, so as to extend generally horizontally toward the body rear. A pair of right- and left-body frames 12 are provided obliquely above from the rear end portions of the respective body frames 11, and are connected to each other at their end portions.

The battery 14 is disposed between the pair of body frames 12. Above the battery 14, a seat 13 is affixed to the body frames 12. A U-shaped seat stay (not shown), which is horizontally retained with its bottom facing the body front, is connected to the body frames 12, and supported by a pair of right- and left-stays 15 (only the left side being shown in FIG. 2 and FIG. 3) which are connected to the body frames 12. The seat 13 is connected to a part of the seat stay so s to be capable of opening and closing.

At the rear ends of the body frames 12, a rear fender 16 is provided, on which a tail lamp 17 and flasher lamps 18 sandwiching the tail lamp 17 are provided.

A pair of right- and left-rear arm brackets 19 (only the left side being shown in FIG. 2 and FIG. 3) are welded to the rear end portions of the body frames 11. The front end of a rear arm 20 is supported by the rear arm brackets 19, so as to be capable of swinging up and down around a pivot axis 21.

At the rear end of the rear arm 20, rear wheels 22 are supported so as to be capable of rotating, and the entire rear arm 20 is suspended from the body frames 12 via a rear cushion 23. As will be specifically described below, the electric motor 28, which is flat along the vehicle width direction, is accommodated in the rear end portion of the rear arm 20. The electric motor 28 drives the rear wheel 22.

Blow the right and left body frames 11, foot steps 24 (only the left side being shown in FIGS. 2 and 3) are provided. Moreover, a side stand 25 is supported so as to be capable of rotating with respect to the rear arm 20 around an axis 26. The side stand 25 is energized by a return spring 27 in a direction of erecting the side stand 25.

Note that, although not specifically described, the electric two-wheeled vehicle 1 is equipped with an appropriate brake system for reducing the rotation speeds or braking the rotations of the front wheel 6 and the rear wheel 22.

Figure 4:
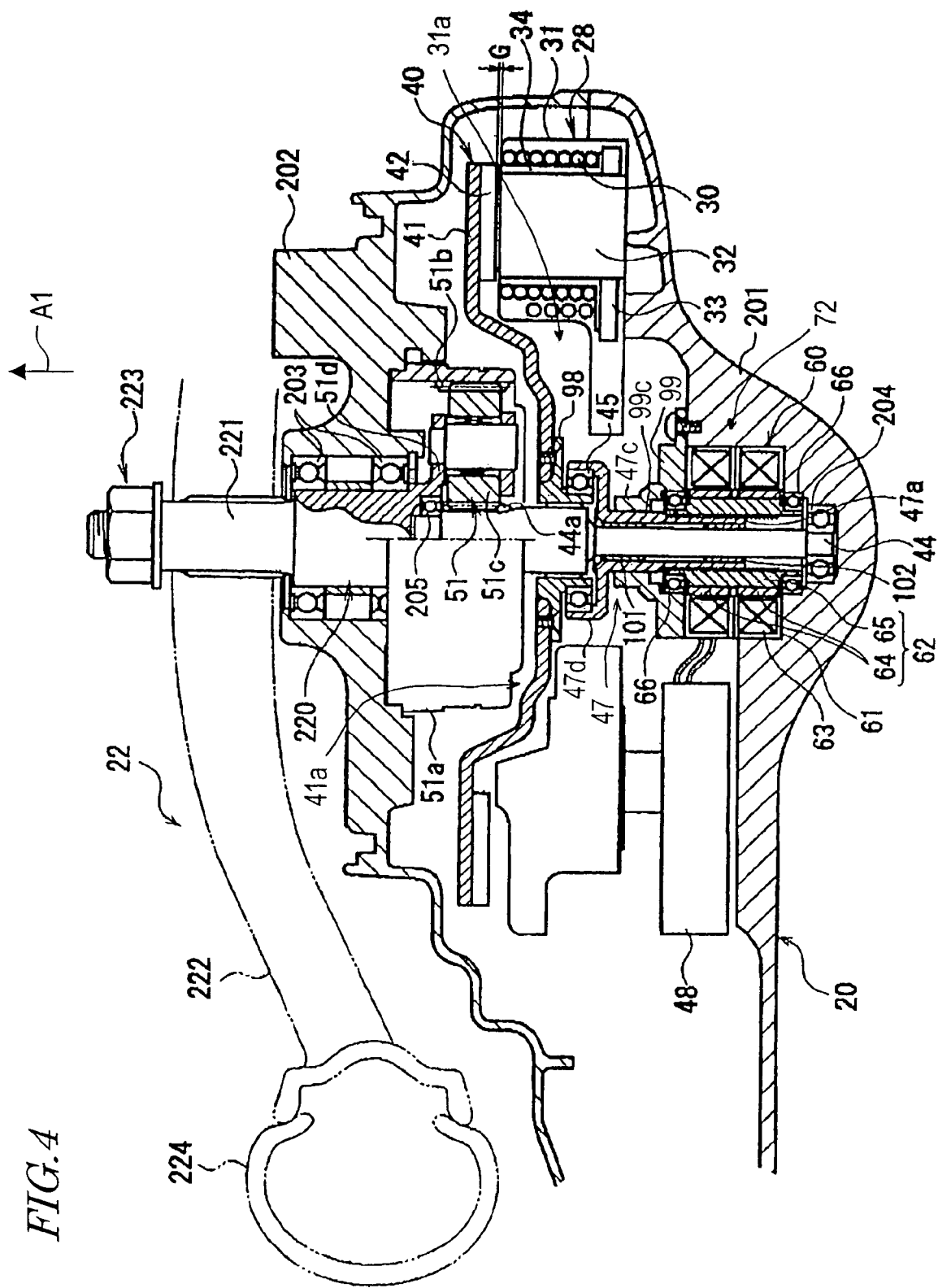
FIG. 4 is a cross-sectional view showing the structure of the neighborhood of an electric motor of the electric two-wheeled vehicle shown in FIG. 2.

Next, the electric motor 28 and its peripheral structure will be specifically described. FIG. 4 shows a cross section of the neighborhood of the rear wheel 22 and the electric motor 28. In the figure, the left side is the body front direction, whereas the upper side of the figure is the body right side. As shown in the figure, the rear end portion of the rear arm 20 constitutes a case 201 for accommodating the electric motor 28, with a cover 202 being attached to the case 201.

Within a space formed by the case 201 and the cover 202, the electric motor 28 having a rotation axis 44, a speed reducer 51 having a rear wheel axis 221 (which is a driving axis), a first driving circuit 71 (shown in FIG. 6), and a second driving circuit 48 are accommodated. As will be specifically described below, the rotation axis 44 of the electric motor 18 and the rear wheel axis 221 of the speed reducer 51 are disposed coaxially, in such a manner that their respective axis centers are located along a line which is parallel to a first direction A1. The rotation of the electric motor is transmitted to the speed reducer 51 via the rotation axis 44, this rotation being slowed down at the speed reducer 51, and transmitted to the rear wheel axis 221.

The rotation axis 44 and the rear wheel axis 221 are supported by bearings 204 and 203, respectively, so as to be capable of rotating. These axes are supported in such a manner that they will not move along the axial direction (first direction). The rear wheel 22 includes a wheel 222 and a tire 224 provided around the outer periphery of the wheel 222, the wheel 222 being inserted into the rear wheel axis 221 and affixed by a nut 223. The rear wheel axis 221 and the wheel 222 are mechanically coupled, for example by serrations (sawteeth-like structure), so that the rotation of the rear wheel axis 221 is transmitted to the wheel 222. As shown in the figure, the wheel 222 preferably has an arch-like rotation cross-sectional shape centered around the portion at which the rear wheel axis 221 is inserted, thus to be able to accommodate a part of the electric motor 28 and the speed reducer 51.

Figure 5:
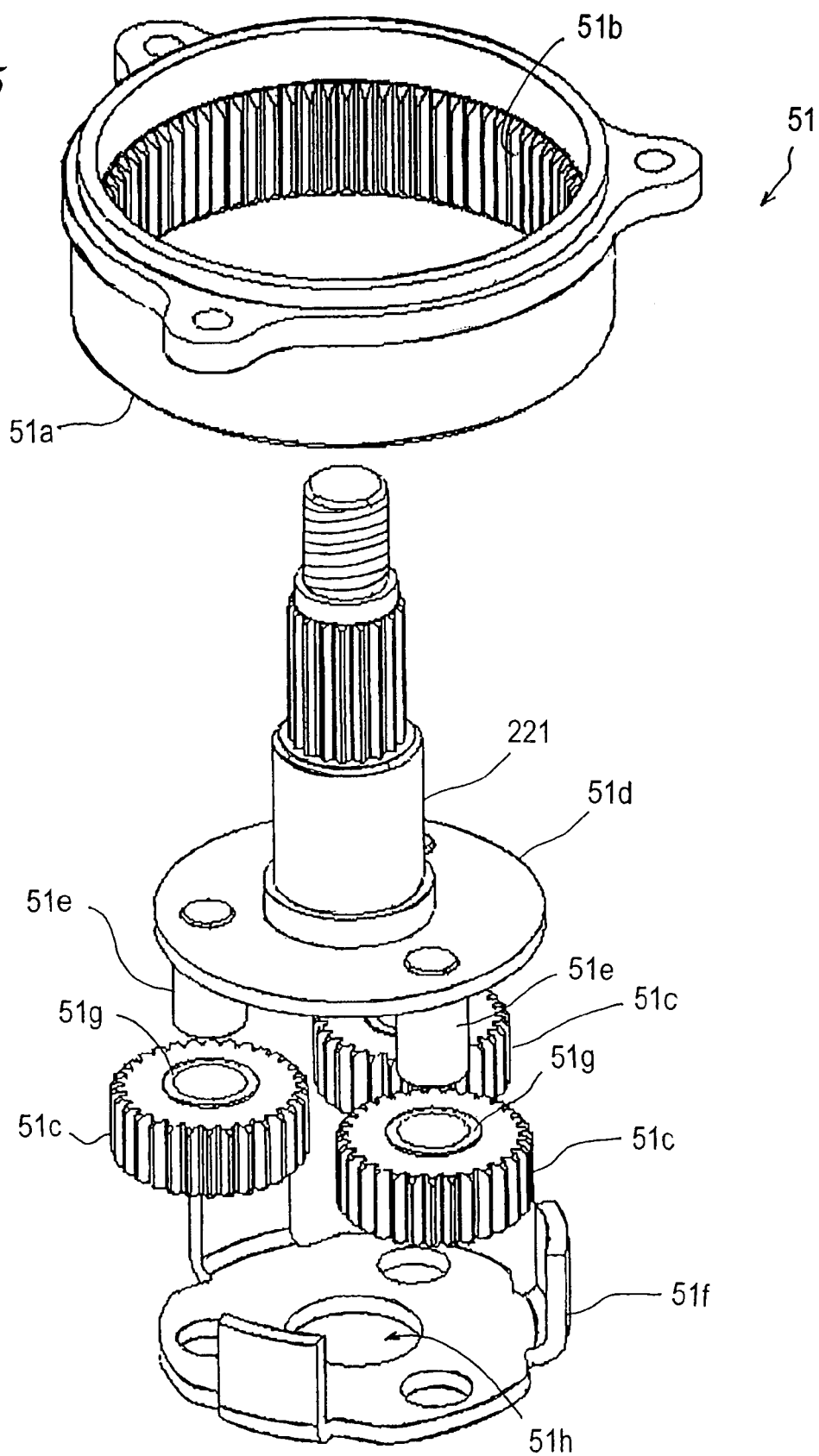
FIG. 5 is an exploded perspective view of a speed reducer shown in FIG. 4.

FIG. 5 is a perspective view showing the structure of the speed reducer 51 in exploded fashion. As shown in FIG. 4 and FIG. 5, the speed reducer 51 includes a housing 51a, planet gears 51c, and a sun gear 44a (FIG. 4) which is provided around the outer periphery of the rotation axis 44. The planet gears 51c are accommodated in a space which is formed by a support plate 51d having spindles 51e and a holder 51f, and are supported so as to be capable of rotating around the respective spindles 51e. In order to reduce the friction between the planet gears 51c and the spindles 51e, it is preferable to provide an oilless bearing 51g around the aperture into which each spindle 51e is inserted. The holder 51f has an aperture 51h into which the sun gear 44a of the rotation axis 44 is inserted. The rear wheel axis 221 is affixed to the center of the support plate 51d.

The housing 51a has a cylindrical interior space, and a ring gear 51b is provided on the side face defining the interior space. The planet gears 51c retained by the support plate 51d and the holder 51f are inserted into the interior space of the housing 51a, so that the planet gears 51c are meshed with the ring gear 51b. The sun gear 44a of the rotation axis 44 which is inserted through the aperture 51h is also meshed with the planet gears 51c.

As the rotation axis 44 rotates, each planet gear 51c rotates around its own spindle 51e, due to meshing with the sun gear 44a. Since the planet gears 51c are also meshed with the ring gear 51b, the planet gears 51c orbit around the rotation center of the rear wheel axis 221 and the rotation center of the rotation axis 44. As a result, the rear wheel axis 221 rotates. The number of teeth and the diameter of each gear are adjusted to appropriate values for obtaining a desired output (torque and revolutions).

Although the present embodiment employs a speed reducer of a planet gear structure, a speed reducer having any other structure may be used. In the case where a speed reducer of a planet gear structure is used, the slowing-down of rotation can occur coaxially with the rotation axis 44 of the electric motor 28, so that the rotation axes of the rear wheel 22 and the motor 28 can be in a coaxial placement. This makes it possible to accommodate a part of the electric motor 28 and the speed reducer 51 in the recessed space of the wheel 222 having an arch-like cross section, thus adopting a so-called wheel-in structure. As a result, a compact drive unit having a tired wheel can be realized.

Figure 6:
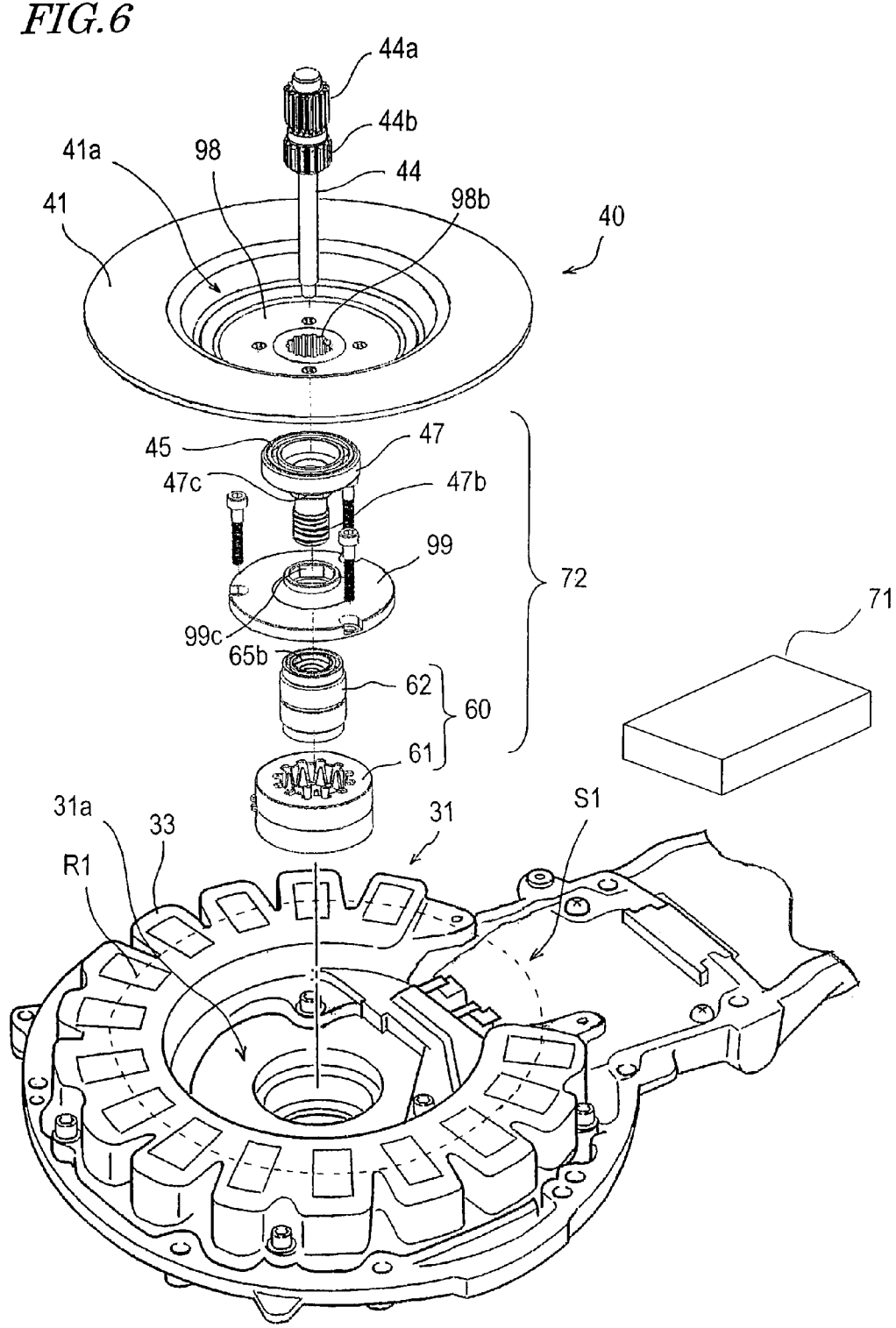
FIG. 6 is an exploded perspective view of the electric motor shown in FIG. 4.

Next, the electric motor 28 will be described. FIG. 6 is a perspective view showing the structure of the electric motor 28 in exploded fashion. As shown in FIG. 4 and FIG. 6, the electric motor 28 comprises a first stator 31, a first rotor 40, a moving mechanism 72, and the aforementioned rotation axis 44.

The first stator 31 includes a generally ring-shaped stator yoke 33, a plurality of teeth 32 (shown in FIG. 4) which are inserted and affixed into fitting apertures provided in the stator yoke 33, and coils 33 which are wound around the respective teeth 32 via bobbins (insulators) 34. The first stator 31 is entirely molded within resin or the like, and is accommodated in the case 201 and affixed with bolts or the like.

As shown in FIG. 6, in the present embodiment, the coils 33 wound around the teeth 32 are disposed so as to leave a space S1 in the circumference shown by a broken line R1. In the space S1 where no coils 33 are disposed, the first driving circuit 71 is placed as shown in FIG. 6. Moreover, the first stator 31 has a space 31a surrounded by the coils 33 and the first driving circuit 71.

By thus placing the coils 33 and the first driving circuit 71, it becomes possible to dispose the first driving circuit 71 on substantially the same plane as the first stator 31, thus reducing the vehicle width near the rear wheel 22. Particularly in the case where the electric motor 28 is used for an electric two-wheeled vehicle, the bulge of the case 201 can be made small. As a result, even if the electric two-wheeled vehicle should fall, the case 201 is unlikely to come in contact with the road surface or the like to result in the breaking of the electric motor 28 and the like accommodated in the case 201.

The first rotor 40 includes a disk-shaped yoke 41 and a bracket 98. The yoke 41 is composed of a ring-shaped flat portion located at the outer periphery and a recess having a space 41a inside. This space 41a is formed in such a size as to be able to accommodate a part of the speed reducer 51. On the opposite side from the side on which the space 41a is provided, the yoke 41 has a protrusion formed with a shape corresponding to the space 41a. Such a shape can be obtained by subjecting a metal plate, which has been formed into a ring shape through a punch process, to a two-step drawing process, for example.

On the side of the yoke 41 opposing the first stator 31, magnets 42 of alternating polarities are disposed (FIG. 4). A throughhole is provided in the center of the yoke 41, and an upper portion of the bracket 98 is fitted into the throughhole. The upper portion of the bracket has a flat portion extending along the radial direction, and is affixed with bolts or the like at the portion where the flat portion overlaps with the yoke 41. On a lower portion of the bracket, a bearing 45 is fitted or abutted on the outside. As is well shown in FIG. 6, the bracket has a center aperture, and on the side face defining the center aperture, grooves (slits or sawteeth) 98b extending along the axial direction are provided. On the other hand, the rotation axis 44 is also provided with grooves 44b for meshing with the grooves 98b. The rotation axis 44 is inserted into the center aperture of the bracket 98 in such a manner that the grooves 44b mesh with the grooves 98b. Through the mechanical coupling between the grooves 44b and the grooves 98b based on serrations, the rotation of the first rotor 40 is transmitted to the rotation axis 44.

As shown in FIG. 4, the rotation axis 44 which is inserted in the first rotor 40 is further inserted into the moving mechanism 72, and supported at one end thereof by the bearing 44 so as to be capable of rotating, in such a manner that the first rotor 40 opposes the first stator 31 and is retained so as to be spaced apart therefrom along the first direction A1. A part of the protrusion of the yoke 41 provided on the face of the first rotor 40 opposing the first stator 31 is inserted in the space 31a of the first stator 31. In other words, a part of the space 41a defined by the first rotor 40 is positioned so as to intrude into the space 31a of the first stator 31, and overlaps therewith when seen in a direction perpendicular to the rotation axis 44. On the other hand, the speed reducer 51, a part of which is retained in the space 41a, also overlaps partially with the space 31a of the first stator 31. As a result, when the electric motor 28 and the speed reducer 21 are disposed coaxially, the length along the axial direction of the space required for disposing them can be shortened. In the case where the electric motor 28 is used for an electric two-wheeled vehicle as in the present embodiment, the bulge of the case 201 can be made small. Therefore, even if the electric two-wheeled vehicle should fall, the case 201 is unlikely to come in contact with the road surface or the like to result in the breaking of the electric motor 28 and the like accommodated in the case 201. This also provides for superb design.

The moving mechanism 72 causes the first rotor to move in such a manner that the relative positions of the first rotor 40 and the first stator 31 are changed. More specifically, the moving mechanism 72 causes the first rotor 40 to move along the first direction A1, thereby adjusting the gap G between the magnets 42 of the first rotor 40 and the first stator 31. To this end, the moving mechanism 72 includes a moving member 47, a detent member 99, and an adjustment motor 60.

The moving member 47 includes a cylindrically-shaped slider 47a and a bearing portion 47d which is connected to an upper end portion of the slider 47a. The bearing portion 47d fits onto the bearing 45 on the outside and retains the bearing 45. The slider 47a has a throughhole in which the rotation axis 44 is inserted. A planar portion 47c is formed in an upper portion of the outer side face of the slider 47a.

The tip of the moving member 47 including the bearing portion 47d is inserted in the space 31a of the first rotor 40. In other words, a part of the moving mechanism 72 is inserted in the space 31a so as to overlap with the first rotor 40. Thus, the length of the electric motor 28 along the first direction A1 can be shortened.

The detent member 99 has a cylindrical aperture in which the slider 47a of the moving member 47 is inserted. On the inner side face of the aperture, a planar portion 99c which engages with the planar portion 47c is formed. A lower portion of the detent member 99 has a flange shape, and is affixed to the case 201.

The slider 47a having been inserted in the throughhole of the detent member 99 is engaged because its planar portion 47c is in contact with the planar portion 99c of the detent member 99. Therefore, the slider 47a is able to move along the first direction A1, but is prevented from rotating around the rotation axis 44.

The detent member 99 may have any structure other than that described above, so long as the detent member 99 permits the moving member 47 to move along the first direction but hinders the moving member 47 from rotating around the rotation axis 44. For example, the slider 47a may have a rectangular cross section perpendicularly to the axial direction of the slider 47a, and the aperture of the detent member 99 may have a shape engaging with that cross section; or, a cross section and an aperture of any other polygon or a shape obtained by a chamfering a part of a circle may be used.

As shown in FIG. 4, in the throughhole of the slider 47a of the moving member 47, oilless bearings 101 and 102 for supporting the rotation axis 44 so as to be capable of rotating are provided at an upper end portion and a lower end portion of the slider 47a. Oilless bearings are composed of fewer members than bearings which have rolling elements such as balls, and therefore are generally inexpensive, thereby contributing to cost reduction. Thus, the moving member 47 is supported so as to be capable of rotating around the rotation axis 44. A thread 47b is provided on the outer side face of the slider 47a.

The adjustment motor 72 causes the moving member 47 to move along the first direction A1, thus moving the first rotor 40. The adjustment motor 72 is e.g. a stepping motor, and includes a cylindrical second stator 61 and a cylindrical second rotor 62. The second stator 61 has a plurality of coils 63, and an aperture in which the second rotor 62 is inserted. The second stator 61 is affixed to the case 201. The second driving circuit 48 for driving the adjustment motor 72 is connected to the coils 63. The second rotor 62 includes a cylindrical portion 65 and a plurality of magnets 64 which are provided on the outside of the cylindrical portion 65 and have magnetic poles. In the cylindrical portion 65, a throughhole in which the slider 47a of the moving member 47 and the rotation axis 44 are inserted is provided. On the inner side face of the throughhole, a thread 65b which meshes with the thread 47b of the slider 47a is provided. The second rotor 62 and the second stator 61 are disposed coaxially with respect to the rotation axis 44.

As shown in FIG. 4, both ends of the cylindrical portion 65 are supported by bearings 66, which are affixed to the detent member 99 and the case 201, so as to be capable of rotating.

When the adjustment motor 72 is driven so that the second rotor 62 rotates, the rotation of the second rotor 62 is transmitted to the slider 47a due to the thread 47b being meshed with the thread 65b. However, the slider 47a is prevented from rotating by the detent member 99. Therefore, responsive to the rotation of the second rotor 62, the thread 65b causes the thread 47b to move along the first direction A1 by a rate which is in accordance with the thread pitch. In other words, the slider 47a moves along the first direction A1. As a result, the moving member 47 causes the first rotor 40 to move along the first direction A1, thus changing the gap G between the first rotor 40 and the first stator 31. The adjustment range of the gap G is to be determined in accordance with the required output characteristics of the electric motor 28. For example, in the present embodiment, the adjustment is made in a range from 1 mm to 10 mm.

In the present embodiment, the rotation of the second rotor 62 is converted into a movement of the slider 47a along the first direction A1 by providing the thread 47b and the thread 65b for the slider 47a and the second rotor 62. However, any other structure may be used. For example, spiral rugged portions may be provided on the inner side face of the cylindrical portion 65 and spiral rugged portions may be provided on the outer side face of the slider 47a, e.g., queued serrations, and the ruggednesses may be engaged with one another. Moreover, a spiral groove may be provided on one of the inner side face of the cylindrical portion 65 and the outer side face of the slider 47a, while a pin which engages with the groove may be disposed on the other.

Next, the operation of the electric motor 28 will be described. When an electric current is flowed in the coils 30 of the first stator 31 by using the first control circuit 71, a magnetic field is generated, and due to repulsive force and attractive force occurring between the generated magnetic field and the magnets 42 of the first stator 40, the first rotor 40 rotates in the fashion of an ordinary motor. The rotation of the first rotor 40 is transmitted to the rotation axis 44; its rotation speed is lowered by the speed reducer 51; and the rotation is transmitted to the rear wheel axis 22.

In order to adjust the gap G between the first stator 31 and the first rotor 40 and vary the output characteristics of the electric motor 28, the moving mechanism 72 is used. Specifically, when the coils 63 of the adjustment motor 72 are driven by the second driving circuit 48, the second rotor 62 rotates. Then, the thread 65b of the second rotor 62 meshes with the thread 47b of the slider 47a, and the moving member 47 moves in parallel to the first direction A1. For example, the moving member 47 moves in the upper direction in the figure, as shown by the arrow. Thus, the first rotor 40 is pushed up via the bearing 45, so that the first rotor 40 moves upward. As a result of this, the gap G is increased. Since the first rotor 40 and the moving member 47 are linked via the bearing 45, the gap G can be adjusted even when the first rotor 40 is rotating. Conversely, the gap G can be varied even when the rotation of the first rotor 40 is stopped.

When the second rotor 62 of the adjustment motor 72 is rotated in the opposite direction to the above, the moving member 47 moves in a lower direction in the figure parallel to the first direction A1. In response thereto, the first rotor 40 is pulled down via the bearing 45, so that the first rotor 40 moves downward. As a result, the gap G is decreased. In the case the first rotor 40 is moved closer to the first stator 31, too, it does not matter whether the first rotor 40 is rotating or stopped.

Figure 7:
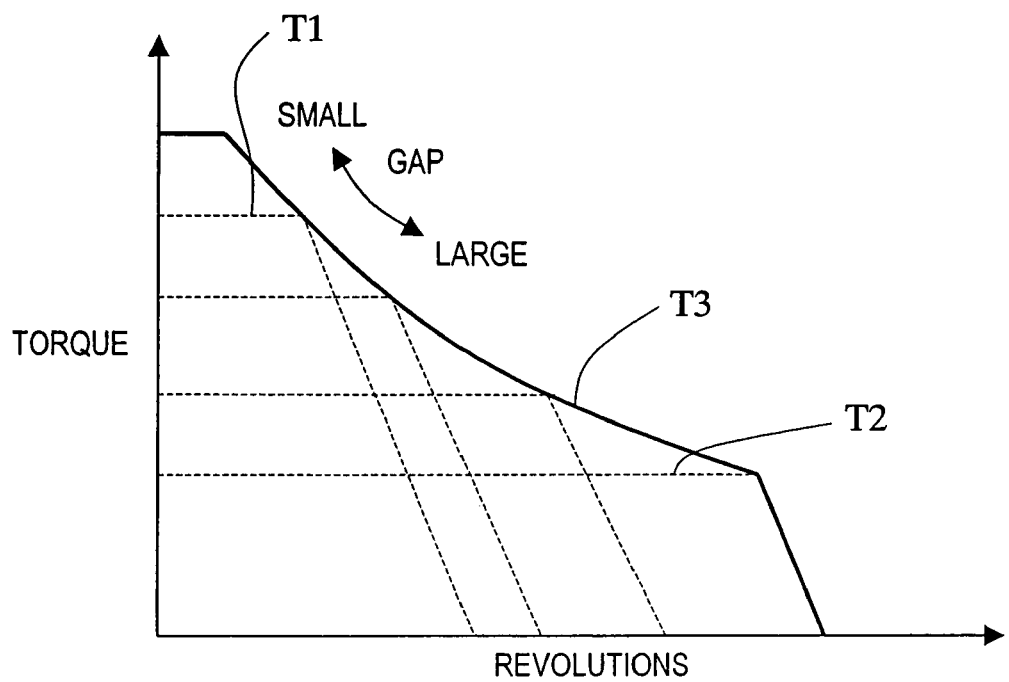
FIG. 7 is a graph showing the torque characteristics of an electric motor of the present embodiment.
Figure 8:
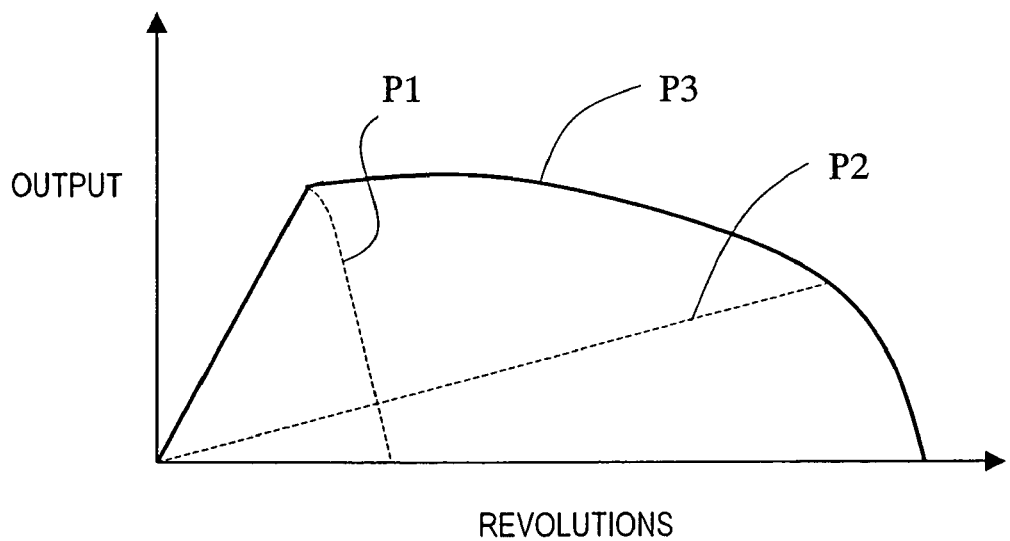
FIG. 8 is a graph showing the output characteristics of an electric motor of the present embodiment.

FIG. 7 and FIG. 8 are graphs schematically showing the output characteristics of the electric motor 28. FIG. 7 shows the torque of the electric motor 28 relative to revolutions. FIG. 8 shows the output relative to rotation speed. In the case where the gap G between the first rotor 40 and the first stator 31 is small, more magnetic flux from the magnets 42 of the first rotor 40 links with the coils of the first stator 31. As a result, a strong torque is generated as indicated by T1 in FIG. 7, and a large output is obtained at low revolutions, as indicated by P1 in FIG. 8. However, in the case where the gap G is small, large induced voltages are generated in the coils of the first stator 31, so that the rotation speed cannot be increased.

On the other hand, in the case where the gap G between the first rotor 40 and the first stator 31 is large, there is relatively little magnetic flux which links from the magnets 42 of the first rotor 40 to the coils of the first stator 31. Therefore, only a small torque is generated, as indicated by T2 in FIG. 7. However, in the case where the gap G is small, the induced voltages occurring in the coils of the first stator 31 are small, so that the rotation speed can be increased. Moreover, as indicated by P2 in FIG. 8, a large output is obtained at high revolutions.

Therefore, as in the case of a conventional electric motor, if the gap between the stator and the rotor is fixed or the gap is adjustable only before shipment of the product, only one type of characteristics between the above can be obtained.

On the other hand, according to the present invention, the gap G can be continuously changed by the moving mechanism during rotation of the electric motor. Therefore, as indicate by T3 in FIG. 7 and P3 in FIG. 8, it is possible to continuously vary the torque and output in accordance with revolutions, and drive the electric motor 28 up to high revolutions.

Therefore, by varying the output characteristics of the electric motor 28, the electric two-wheeled vehicle 1 is able to rotate the rear wheel 22 with a large torque at the start or when going up a slope, etc., and when traveling on a flat road or the like in a steady state, the motor revolutions can be increased so that the electric two-wheeled vehicle can be operated at a high speed.

Particularly, in the present embodiment, the gap G is set in the direction of the attractive force acting on the magnets 42 of the first rotor 40 and the teeth of the first stator 31. Therefore, in the region where the first rotor 40 lies near the first stator 31, the magnetic flux amount changes greatly in response to a slight change in the gap. Thus, the output characteristics are greatly varied by slightly changing the gap G.

On the other hand, according to the present embodiment, the rotation of the adjustment motor is converted into a movement of the moving member along the first direction, via threads. The amount of movement of the moving member is determined by the thread pitch, and the movement of the moving member can be accurately controlled by the rotation of the adjustment motor. Moreover, the amount of movement of the moving member can be easily adjusted based on the thread pitch. Therefore, even in a region where the magnetic flux amount of the gap G changes greatly, the output characteristics can be accurately controlled by using the adjustment motor. Since it is unnecessary to prescribe a large gap G, the thickness of the electric motor along the axial direction can be made small.

For these reasons, it is preferable that the electric motor of the present invention adopts an axial gap structure in which the magnets of the first rotor 40 oppose the teeth of the first stator 31 along the first direction A1 (which is the direction of the rotation axis of the first rotor 40) with the gap G, and that the output characteristics are adjusted by moving the first rotor 40 along the direction of the rotation axis. Some electric motors have a radial gap structure, in which the rotor and stator teeth are opposing along a radial direction; however, in this case, a complicated structure would be required for moving the rotor along the radial direction to cause a change in the output characteristics, or the structure for making the movement would become bulky. It could be possible in an electric motor of a radial gap structure to move the rotor along the direction of the rotation axis and thus change the output characteristics. However, the change in the magnetic flux amount in this case is in proportion with the area in which the magnets of the rotor overlap with the stator teeth. Therefore, in order to adjust the output characteristics, the rotor needs to make a large movement along the direction of the rotation axis, for which reason the outer shape of the electric motor along the axial direction must become large.

Thus, as has been specifically described with reference to the figures, according to the present embodiment, the output characteristics of an electric motor can be adjusted by using an adjustment motor to move the first rotor and adjust the gap between the first rotor and the first stator, thus changing the magnetic flux amount.

Since the first rotor and the rotation axis of the electric motor are coupled through meshing of teeth, e.g., serrations, the large rotary force provided by the first rotor can be securely transmitted to the rotation axis, and it is possible to allow only the first rotor to slide relative to the rotation axis. Since the position of the rotation axis does not change even if the first rotor is moved, it is possible to firmly affix the rotation axis to a case or the like and cause the first rotor to stably rotate.

Moreover, a driving axis, to which a tired wheel or the like is connected, can be disposed coaxially with the rotation axis, and the position of the driving axis does not change even if the first rotor is moved. Therefore, the position of the tired wheel is not displaced even if the first rotor is moved.

Since the moving mechanism is disposed coaxially with the rotation axis of the first rotor, the direction of the force occurring between the first rotor and the first stator (which occurs responsive to the attractive force of magnets) can be made generally equal to the direction in which the moving member moves. Therefore, the moving member can be stably moved, without there being a large load on the moving mechanism. As a result, the structure of the moving mechanism can be simplified. Since the energy loss due to friction force or the like is also reduced, the adjustment motor may be a small-sized one having a small output. Thus, the entire electric motor can be made small and light-weight. Since the energy efficiency of the adjustment motor is increased, in the case where the electric motor is driven with a battery, the battery capacity can be reduced.

Moreover, the speed reducer and the moving mechanism are disposed in such a manner that the first rotor and the first stator are interposed therebetween along the direction of the rotation axis. As a result, complication of structure which would result from disposing these elements on the same side is prevented, whereby increased freedom in shape can be provided. Moreover, a part of the moving mechanism and the speed reducer are positioned so as to intrude into the space of the first stator on both sides, thus overlapping with the space of the first stator. Therefore, the thickness along the direction of the rotation axis can be reduced, whereby a compact electric motor is realized. In the case where the present invention is applied to a wheel-in motor of an electric vehicle or the like as in the case of the present embodiment, the center of gravity of the large-weight rotating electric machine is positioned generally on the wheel axis, so that weight impartialness is avoided and the stability during straight movements and turning is improved.

Moreover, since the rotation axis penetrates through the moving member and the adjustment motor (which belong to the moving mechanism), the rotation axis can be supported by stable members, such as a case accommodating the electric motor or an arm of the electric two-wheeled vehicle. If the rotation axis did not penetrate, one end of the rotation axis would have to be supported by the moving member of the moving mechanism or the like. However, since the moving member has a movable structure, its support would be unstable, and wobbling of the rotation axis might occur. Moreover, vibration and noise might occur, and the friction or the like associated therewith might lead to problems such as loss of rotation energy and metal fatigue. In order to prevent these, it would be necessary to further increase the strength of the moving member and the structure supporting the moving member, which might invite an increase in weight.

Moreover, the moving member is supported by a rotation axis which penetrates via oilless bearings. Therefore, even in the case where some of the teeth of the first stator are missing so that a force is applied from the first stator so as to tilt the first rotor, the tilts of the first rotor and the moving member can be restrained by the rotation axis. As a result, without there being a large friction between the moving member and the first rotor, the moving member can stably move along the direction of the rotation axis, thus moving the first rotor. Moreover, energy loss due to friction can be reduced, thus enhancing the energy efficiency of the electric motor. In the case where the electric motor is driven with a battery, the capacity of the battery can be reduced, and the weight can be made light. As a result, the self weight of the entire vehicle is reduced, and the travel distance can be extended.

Moreover, since the moving member is disposed in contact with the first rotor so as to be on a pressing side against the attractive force occurring between the first rotor and the first stator, mutually pressing forces occur between the moving member and the first rotor. Therefore, in the case where bearings are to be provided therebetween, the structure of the moving mechanism can be more simplified than in the case where tensile forces are occurring between the moving member and the first rotor, thus being effective for the downsizing of the mechanism, reduction of the number of parts, and cost reduction. In the case where the moving mechanism is to be affixed to a case or an arm of the electric two-wheeled vehicle or the like, too, a simple structure can be adopted.

Moreover, by using bearings between the moving member and the first rotor, even if a tilt occurs between the moving member and the first rotor, the tilt can be absorbed or reduced by the interspaces within the bearings and the like. As a result, scraping and sliding resistance between the rotation axis and the first rotor can be reduced, so that generation of vibration and noise can be prevented and a small-sized adjustment motor whose output is small can be used. Thus, the moving member can be driven with low power consumption.

In the present embodiment, the electric two-wheeled vehicle has a speed reducer so that the rotation of the electric motor is transmitted to the rear wheel axis after being slowed down. However, instead of a speed reducer, a transmission for accelerating rotation or increasing revolutions may be provided. Alternatively, a variable transmission capable of varying the rotation speed may be provided. In addition to or instead of a speed reducer or the like, the electric two-wheeled vehicle may comprise other mechanical elements such as a one-way clutch.

Moreover, the moving member and the bearing, and the bearing and the first rotor, do not need to be completely connected to each other. When the moving member causes the first rotor to become spaced apart from the first stator, the moving member presses the first rotor against the attractive force between the first stator and the first rotor; therefore, the first rotor can surely move even if the aforementioned connections are not made. When the first rotor is moved closer to the first stator, the moving member is moved until the first rotor abuts with the moving member because of the attractive force between the first stator and the first rotor; therefore, the first rotor can be surely moved even if the aforementioned connections are not made. Note that, even in the case where the moving mechanism is disposed in such a manner as to pull the first rotor against this attractive force, the first rotor can be pulled by allowing the moving member and the first rotor to abut with each other. In this case, attractive force can be utilized for moving the first rotor in the attracting direction.

Second Embodiment

Figure 9:
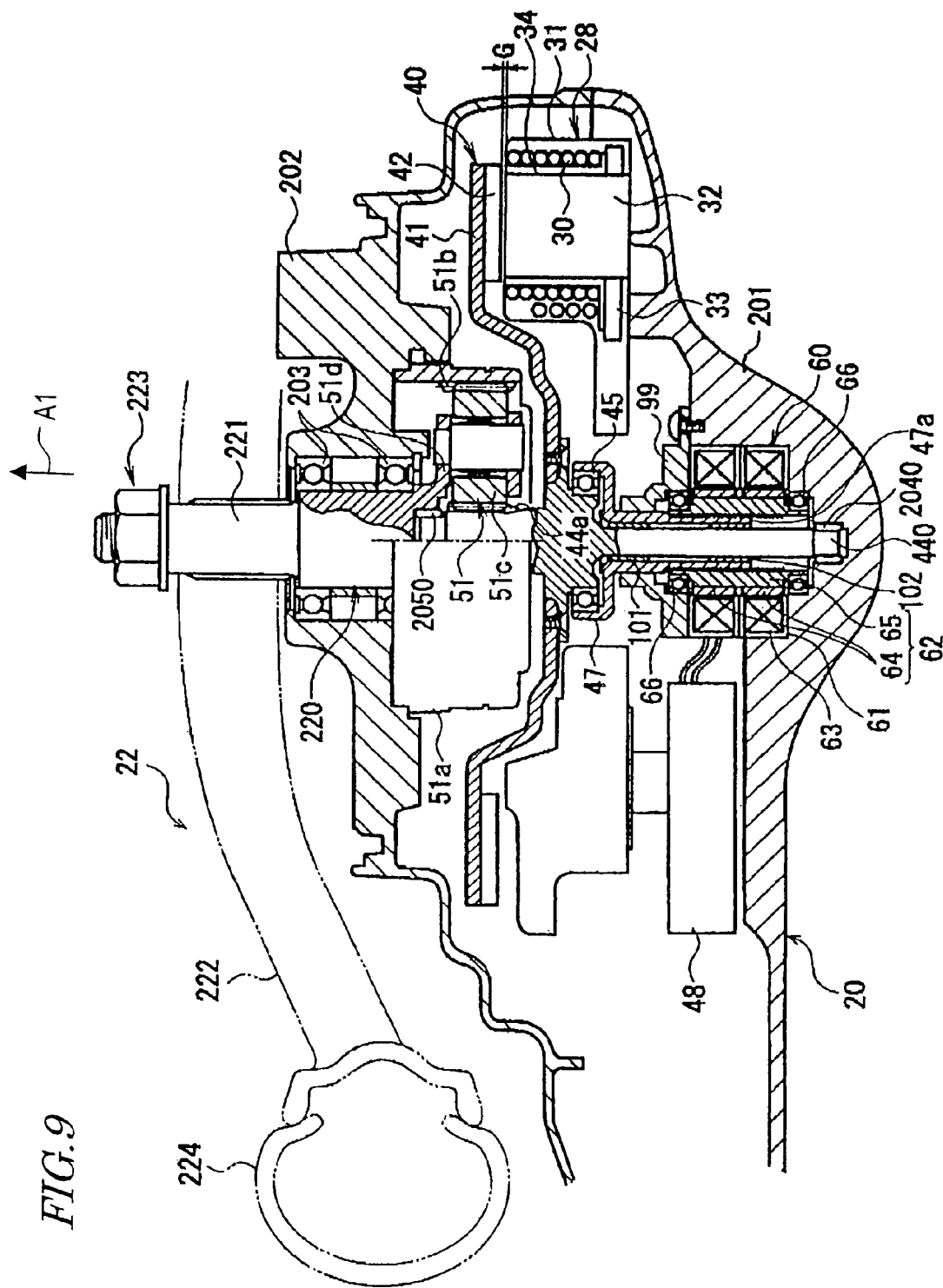
FIG. 9 is a cross-sectional view showing the structure of the neighborhood of an electric motor of an electric two-wheeled vehicle as a second embodiment of the present invention.

FIG. 9 shows a second embodiment of an essential portion of a rotating electric machine and an electric vehicle according to the present invention. An electric motor as the rotating electric machine of the present embodiment differs from the first embodiment in that the rotation axis is affixed to the first rotor. Other structures are identical to those of the first embodiment. Therefore, the same reference numerals are used, and the descriptions of the identical structures will be omitted to avoid redundancy.

In the present embodiment, the rotation axis 440 is integrally formed so as to include a bracket, the bracket being affixed to the first rotor 40. At one end of the rotation axis 440, an oilless bearing 2040 is provided instead of the bearing 204, supporting one end of the rotation axis 440 so as to be slidable with respect to the case 201 along the axial direction. Moreover, an oilless bearing 2050 is provided for the speed reducer, supporting the other end of the rotation axis 440 so as to be slidable with respect to the rear wheel axis 221 along the axial direction.

When the moving member 47 moves in parallel to the first direction due to rotation of the second rotor 62 of the adjustment motor, the first rotor 40 and the rotation axis 440 move integrally. As a result of this, as in the first embodiment, the gap between the first stator 31 and the first rotor 40 can be adjusted. At this time, the sun gear 44a of the rotation axis 440 moves in parallel to the first direction, and slides with respect to the planet gears 51c.

According to the present embodiment, the first rotor 40 and the rotation axis 440 are affixed, so that it is unnecessary to provide an interspace between the rotation axis 440 and the first rotor 40 for allowing the rotation axis to slide, and the rotation axis 440 and the first rotor 40 integrally rotate without wobbling. As a result, the first rotor 40 can be stably rotated. Since the displacement of the rotation axis 440 is absorbed at the speed reducer, any unpleasant travel feel associated with a displacement of the rear wheel axis 221 (which is the driving axis) causing a displacement of the tire position can be prevented.

Third Embodiment

Figure 10:
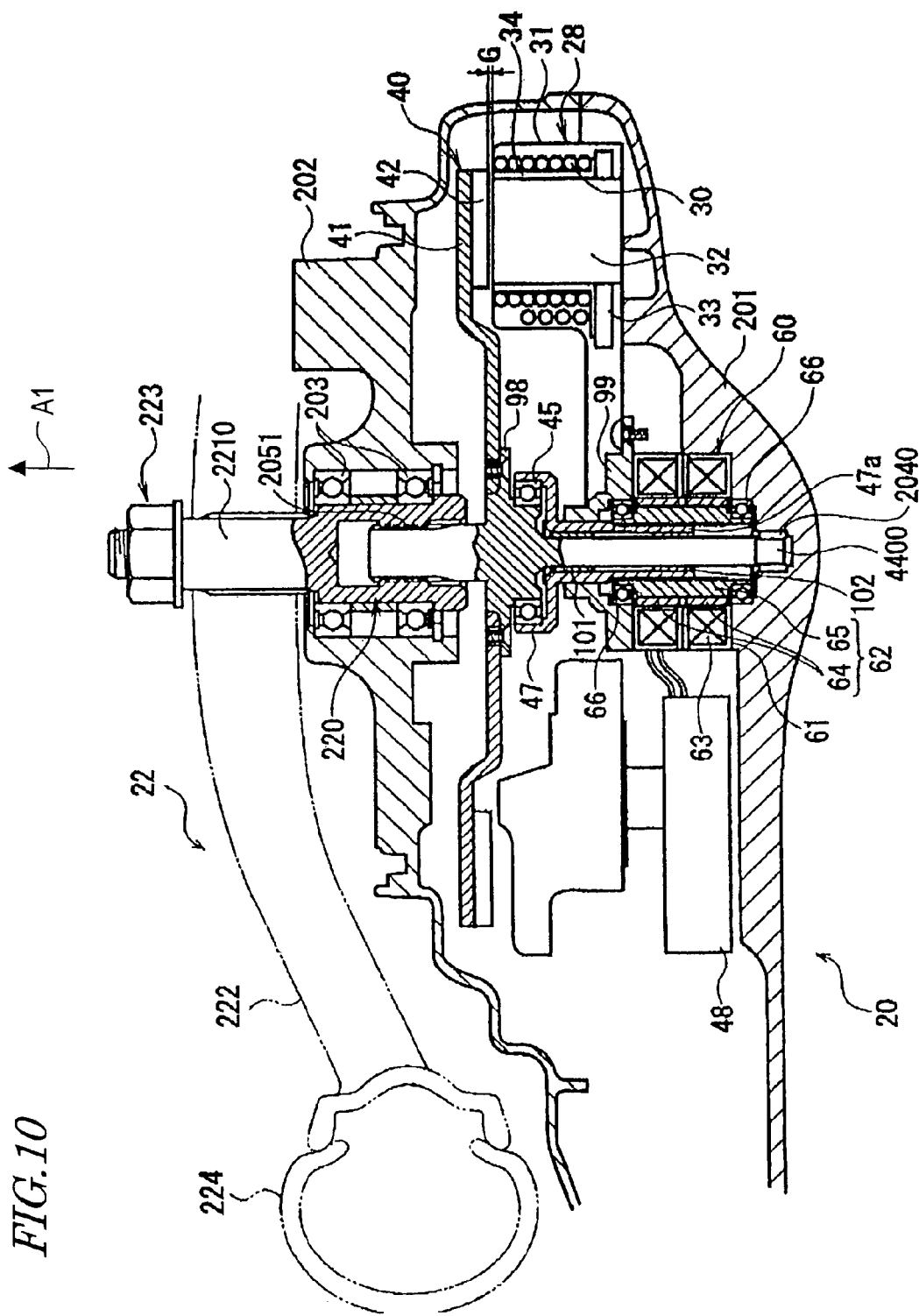
FIG. 10 is a cross-sectional view showing the structure of the neighborhood of an electric motor of an electric two-wheeled vehicle as a third embodiment of the present invention.

FIG. 10 shows an essential portion of a third embodiment of a rotating electric machine and an electric vehicle according to the present invention. The present embodiment differs from the second embodiment in that no speed reducer 51 is comprised. Specifically, a rotation axis 4400 includes an integrally-formed bracket, the bracket being affixed to the first rotor 40.

A rear wheel axis 2210 has a space in which an end portion of the rotation axis 4400 is coaxially contained, and the side face defining the space and the outer side face of the rotation axis 4400 are coupled via serrations. If the moving member 47 moves in parallel to the first direction due to rotation of the second rotor 62 of the adjustment motor, the first rotor 40 and the rotation axis 4400 move integrally. As a result, as in the first embodiment, the gap between the first stator 31 and the first rotor 40 can be adjusted. At this time, through serration coupling, the rotation axis 4400 and the rear wheel axis 2210 transmit the rotation of the rotation axis 4400 to the rear wheel axis 2210, while permitting the rotation axis 4400 to move along the first direction.

According to the present embodiment, since no speed reducer is used, the outer shape of the driving mechanism can be made smaller. Moreover, the effects similar to those in the second embodiment can be obtained.

The shape of each rotating electric machine shown in the above embodiments is exemplary. The rotating electric machine only needs to have a shape such that the magnetic flux amount can be varied and the output characteristics can be adjusted by moving the rotor of the rotating electric machine relative to the stator along the axial direction.

Although the magnets are disposed on the rotor side in the above embodiments, the present invention is also applicable to a rotating electric machine in which magnets are disposed on the stator side and coils are disposed on the rotor side.

Although the above embodiments each illustrate a motor as a rotating electric machine, the present invention may be an electric generator, or a driving motor in an electric vehicle that is utilized as an electric generator and motor, such as a regenerative brake.

Furthermore, although the above embodiments illustrate electric two-wheeled vehicles, the present invention is also applicable to an electric vehicle having three or more wheels. Moreover, the front wheel of an electric two-wheeled vehicle may be a driving wheel, or the front wheel and the rear wheel may be driven by an electric motor. Alternatively, an electric vehicle, including an electric two-wheeled vehicle, may comprise any other driving apparatus (e.g., an internal combustion engine such as an engine) in addition to the rotating electric machine of the present invention.

INDUSTRIAL APPLICABILITY

According to the present invention, the relative positions of a rotor and a stator along the direction of the rotation axis can be adjusted by a moving mechanism, so that a rotating electric machine which is capable of adjusting its output characteristics is realized.

This rotating electric machine can be suitably used for a variety of electric vehicles, and particularly suitably used for an electric two-wheeled vehicle.

The invention claimed is:

1. A rotating electric machine comprising:
a rotation axis extending along a first direction;
a first rotor for coupling with the rotation axis to rotate together with the rotation axis;
a first stator disposed so as to oppose the first rotor while being spaced apart from the first rotor along the first direction; and
a moving mechanism for moving the first rotor along the first direction in order to change relative positions of the first rotor and the first stator to adjust a gap between the first rotor and the first stator,
wherein the moving mechanism includes a moving member having a cylindrical shape having a throughhole, the rotation axis being inserted in the throughhole, and the moving member pushes the first rotor along the first direction to move the first rotor so as to be spaced apart from the first stator.

2. The rotating electric machine of claim 1, wherein the moving mechanism further includes a detent member for engaging with the moving member so as to prevent the moving member from rotating with the first rotor.

3. The rotating electric machine of claim 2, wherein the moving mechanism further includes a bearing, and the moving member and the first rotor are in contact with each other via the bearing.

4. The rotating electric machine of claim 2, wherein the moving mechanism further includes a bearing provided between the moving member and the rotation axis.

5. The rotating electric machine of claim 4, wherein the bearings are provided at least near both ends of the throughhole of the moving member.

6. A rotating electric machine comprising:
a rotation axis extending along a first direction;
a first rotor for coupling with the rotation axis to rotate together with the rotation axis;
a first stator disposed so as to oppose the first rotor while being spaced apart from the first rotor along the first direction; and
a moving mechanism for moving the first rotor along the first direction in order to change relative positions of the first rotor and the first stator to adjust a gap between the first rotor and the first stator,
wherein the moving mechanism includes an adjustment motor, and the gap between the first rotor and the first stator is adjusted by converting rotation of the adjustment motor into a displacement along the first direction for moving the first rotor along the first direction.

7. A rotating electric machine comprising:
a rotation axis extending along a first direction;
a first rotor for coupling with the rotation axis to rotate together with the rotation axis;
a first stator disposed so as to oppose the first rotor while being spaced apart from the first rotor along the first direction; and
a moving mechanism for moving the first rotor along the first direction in order to change relative positions of the first rotor and the first stator to adjust a gap between the first rotor and the first stator,
wherein the moving mechanism includes an adjustment motor having a second rotor having a throughhole, and as the rotation axis is inserted in the throughhole of the second rotor and the second rotor rotates around the rotation axis, rotation of the adjustment motor is converted into a displacement along the first direction for moving the first rotor along the first direction, whereby the gap between the first rotor and the first stator is adjusted.

8. The rotating electric machine of claim 2, wherein,
the moving mechanism further includes an adjustment motor;
the adjustment motor includes a second rotor having a throughhole in which the rotation axis and the moving member are inserted;
a side face defining the throughhole has a thread; and
an outer side face of the moving member has a thread for meshing with the thread on the inner side face of the second rotor.

9. The rotating electric machine of claim 8, wherein the rotation axis penetrates through the second rotor of the adjustment motor, and has an end portion which is supported by a bearing.

10. A rotating electric machine comprising:
a rotation axis extending along a first direction;
a first rotor for coupling with the rotation axis to rotate together with the rotation axis;
a first stator disposed so as to oppose the first rotor while being spaced apart from the first rotor along the first direction; and
a moving mechanism for moving the first rotor along the first direction in order to change relative positions of the first rotor and the first stator to adjust a gap between the first rotor and the first stator,
wherein the rotation axis and the first rotor are coupled via serrations, and the first rotor is slidable with respect to the rotation axis along the first direction.

11. The rotating electric machine of claim 2, wherein the first stator has a space provided near the rotation axis, and at least a part of the moving member is located in the space.

12. A rotating electric machine comprising:
a rotation axis extending along a first direction;
a first rotor for coupling with the rotation axis to rotate together with the rotation axis;
a first stator disposed so as to oppose the first rotor while being spaced apart from the first rotor along the first direction; and
a moving mechanism for moving the first rotor along the first direction in order to change relative positions of the first rotor and the first stator to adjust a gap between the first rotor and the first stator,
wherein the first rotor has a plate shape having a recess near the rotation axis, the recess being depressed in the axial direction.

13. The rotating electric machine of claim 12, further comprising:
a driving axis disposed coaxially with the rotation axis; and
a transmission for converting and transmitting a rotation speed of the rotation axis to the driving axis,
wherein at least a part of the transmission is inserted in the recess of the first rotor.

14. The rotating electric machine of claim 13, wherein the transmission is a speed reducer, the speed reducer including:
a sun gear provided on the rotation axis;
a ring gear; and
a planet gear rotating around a rotation axis affixed to the driving axis, and orbiting around the driving axis by being meshed with the sun gear and the ring gear.

15. A rotating electric machine comprising:
a rotation axis extending along a first direction;
a first rotor for coupling with the rotation axis to rotate together with the rotation axis;

a first stator disposed so as to oppose the first rotor while being spaced apart from the first rotor along the first direction;

a moving mechanism for moving the first rotor along the first direction in order to change relative positions of the first rotor and the first stator to adjust a gap between the first rotor and the first stator;

a driving axis disposed coaxially with the rotation axis; and a transmission for converting and transmitting a rotation speed of the rotation axis to the driving axis, wherein the first rotor has a plate shape having a recess near the rotation axis, the recess being depressed in the axial direction; at least a part of the transmission is inserted in the recess of the first rotor; and the transmission and the moving mechanism are disposed so that the first rotor is interposed therebetween.

16. The rotating electric machine of claim 4, further comprising a driving circuit for generating a magnetic field in the first stator, wherein the first stator includes a plurality of coils which are disposed along a circumference while leaving a space therein, and the driving circuit is disposed in the space in the circumference.

17. The rotating electric machine of claim 8, wherein the rotation axis and the first rotor are moved integrally by the moving member.

18. The rotating electric machine of claim 17, further comprising a driving axis disposed coaxially with the rotation axis, wherein the rotation axis and the driving axis are coupled via serrations, and the rotation axis is slidable with respect to the driving axis along the first direction.

19. An electric vehicle comprising:

a rotating electric machine defined in any of claims 1, 7, and 15; and a tired wheel driven by the rotating electric machine.

20. A two-wheeled vehicle comprising:

a rotating electric machine defined in any of claims 1, 7, and 15; and a tired wheel driven by the rotating electric machine.

21. An electric vehicle unit comprising:

a rotating electric machine defined in any of claims 1, 7, and 15; and a tired wheel driven by the rotating electric machine.

* * * * *

UNITED STATES PATENT AND TRADEMARK OFFICE
CERTIFICATE OF CORRECTION

PATENT NO. : 7,309,941 B2  Page 1 of 1
APPLICATION NO. : 10/551515
DATED : December 18, 2007
INVENTOR(S) : Murota et al.

It is certified that error appears in the above-identified patent and that said Letters Patent is hereby corrected as shown below:

Title page Col. 1, please add item
--(30) Foreign Application Priority Data
JAPAN 2003-096686 3/31/2003
JAPAN 2003-096677 3/31/2003
JAPAN 2003-096700 3/31/2003--

Signed and Sealed this

Sixth Day of May, 2008

JON W. DUDAS
*Director of the United States Patent and Trademark Office*